United States Patent

Raffa

[11] Patent Number: 5,934,754
[45] Date of Patent: Aug. 10, 1999

[54] AUTOMOBILE PET HEAD REST

[76] Inventor: Christina Raffa, 57 Eustis Ave., Newport, R.I. 02840

[21] Appl. No.: 09/102,206

[22] Filed: Jun. 22, 1998

[51] Int. Cl.$^6$ ....................................................... A47C 1/10
[52] U.S. Cl. .......................... 297/392; 297/399; 297/220
[58] Field of Search ........................... 297/411.23, 411.2, 297/391, 392, 397, 401, 399, 423.39, 219.1, 220; 119/28.5, 729; 5/642, 118, 119

[56] References Cited

U.S. PATENT DOCUMENTS

| | | |
|---|---|---|
| 91,389 | 1/1869 | Weeden . |
| 2,553,385 | 5/1951 | Ruth . |
| 2,566,757 | 9/1951 | Alexander . |
| 2,871,928 | 2/1959 | Swenson . |
| 2,983,310 | 5/1961 | Warlick et al. . |
| 3,029,107 | 4/1962 | Myers . |
| 4,860,689 | 8/1989 | Stewart . |
| 5,048,892 | 9/1991 | Ledbetter . |
| 5,700,053 | 12/1997 | Downing . |

Primary Examiner—Milton Nelson, Jr.
Attorney, Agent, or Firm—Salter & Michaelson

[57] ABSTRACT

A pet head rest that is attachable to the top edge of an automobile passenger side or driver side window. The head rest provides a cushioned support for a dog to rest its head when extending same outside of the automobile window. The head rest includes an elongate U-shaped cushioned body having opposing ends and a pair of generally parallel side edges which extend between opposing ends and extend the entire length of the cushion body to define a slot opening for receiving the top edge of the automobile window. A clipping mechanism is provided for biasing the side edges of the cushion body inwardly for releasably mounting the head rest to the top edge of the automobile window.

8 Claims, 4 Drawing Sheets 5,934,754

AUTOMOBILE PET HEAD REST

BACKGROUND AND SUMMARY OF INVENTION

This invention relates generally to pet accessories, and more particularly to a cushioned head rest that is releasably attachable to the top edge of an automobile passenger side or driver side window. The head rest provides a comfortable cushioned support for the underside of a dog's chin when the dog extends his head outside of the automobile window.

Pet supports and perches are generally well known in the prior art. In this regard U.S. Pat. No. 4,860,689 issued to Stewart and U.S. Pat. No. 4,951,998 issued to McClain are the closest prior art to the subject matter of the instant invention to which the applicant is aware. The Stewart reference discloses a pet lounge having a bolster for providing a headrest for the pet. The McClain reference shows a pillow or head rest for use with an automobile window. However, neither of these references show an elongate cushion support that is releasably attachable to the top edge of the passenger side or driver side window of an automobile.

A relatively large number of American residents and families are pet owners. In order to fully enjoy the pet, the pet owner must accept the responsibilities involved with owning a pet. Most importantly, especially with dogs, the pet must be properly trained during its puppy years if it is expected to peacefully co-exist with the owner. Such training may be done by the owner, if he or she has the time, or the puppy may be enrolled in a training school which specializes in the important aspects of training an infant pet. Also of importance during the puppy stage of a dog is to not leave the puppy alone for extended periods of time and to make an effort to give the puppy a reasonable amount of attention. In this respect, when the owner is leaving home, it is probably a good idea to bring the puppy along so that it will not be left alone at home. In order for the puppy to become comfortable with riding in an automobile, it is important that it be taken for as many rides as possible during its puppy years so that it will become more accustomed to riding in a vehicle when it gets older. Many pet owners receive great enjoyment from their pets. In this regard, the owners take pride in obtaining any pet supply which will make their dog's life more enjoyable. The instant invention relates to a pet accessory which makes the experience of riding in an automobile more pleasant for a dog.

The instant invention is directed to a pet head rest attachable to the top edge of an automobile passenger side or driver side window. The head rest provides a cushioned support for a dog to rest its head on when extending same outside of the automobile window. The head rest includes an elongate U-shaped cushioned body having opposing ends and a pair of generally parallel side edges extending between the opposing ends and extending the entire length of the cushioned body. The side edges define a slot opening for receiving the top edge of the automobile window. The head rest further includes a pair of clips for biasing the side edges of the cushioned body inwardly for releasably and frictionally mounting the head rest on the top edge of the automobile window.

Accordingly, among the several objects of the instant invention are: the provision of a pet head rest that is releasably attachable to the top edge of an automobile side window; the provision of a head rest that provides a cushioned support for a dog to rest its head on when extending same outside of the automobile window; the provision of a head rest that makes the experience of riding in an automobile more pleasant for a dog; the provision of a head rest that may be easily installed and removed from the automobile window depending on whether the dog is or is not riding in the automobile; the provision of a head rest that may have any number of differently designed aesthetically pleasing covers that are releasably secured to the exterior of the head rest; the provision of a head rest that is neat and attractive in appearance; and the provision of a head rest that is cost efficient and easy to manufacture.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
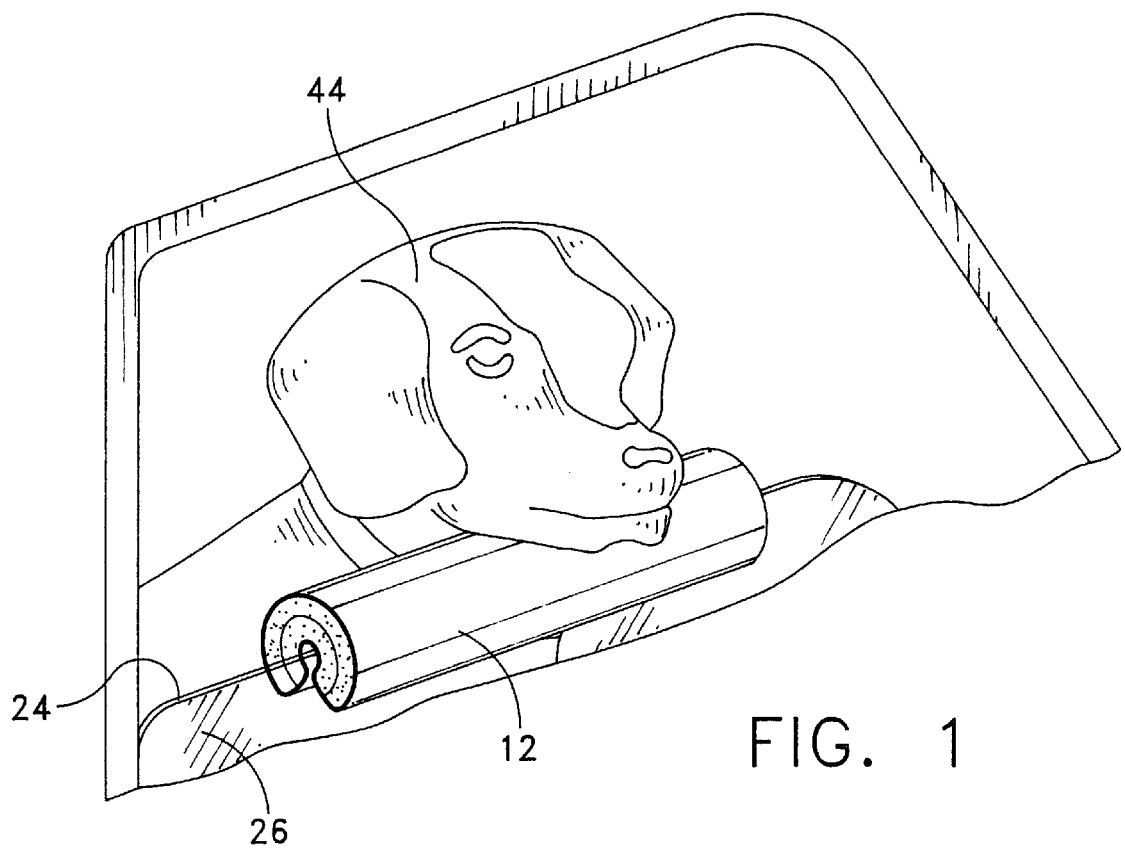
FIG. 1 is a perspective view showing the pet rest of the instant invention mounted on the top edge of an automobile window with a dog resting his head thereon.

Referring now to the drawings, and more particularly to FIG. 1, the pet head rest of the instant invention is shown and generally indicated at 10. As will hereinafter be more fully described, the instant invention provides for a pet head rest that is releasably attachable to the top edge of an automobile side window. The head rest provides a cushion support for the underside of a dog's chin when it extends its head outside of the automobile window.

Figure 2:
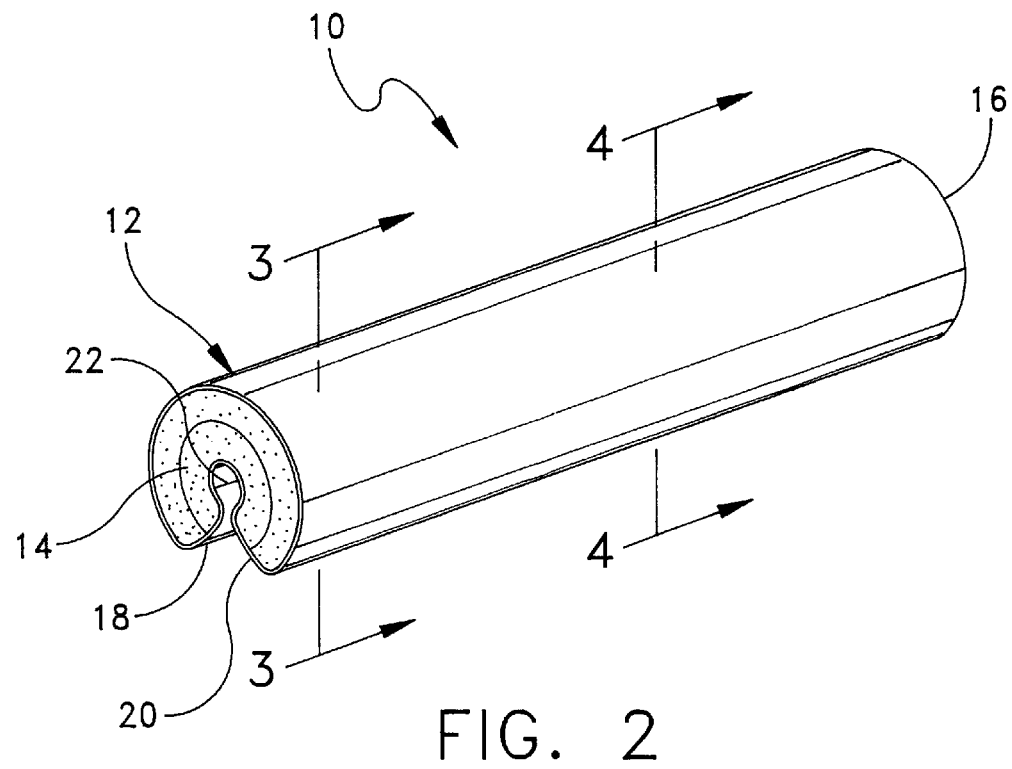
FIG. 2 is a perspective view of the pet head rest of the instant invention.

Referring now to FIG. 2, the pet head rest 10 includes an elongate U-shaped cushion body generally indicated at 12. The body 12 of the head rest 10 terminates at opposing ends indicated at 14 and 16. A pair of generally parallel side edges indicated at 18 and 20 extend the entire length of the body 12 between opposing ends 14 and 16 to define a slot opening 22 in the body 12 of the head rest 10 for receiving the top edge 24 of an automobile side window 26. A pair of clipping members, not shown in FIG. 2, are operable for normally biasing the side edges 18 and 20 of the slot opening 22 inwardly so that head rest 10 may be releasably and frictinally secured to the to the top edge 24 of an automobile window 26 as shown in FIG. 1.

Figure 3:
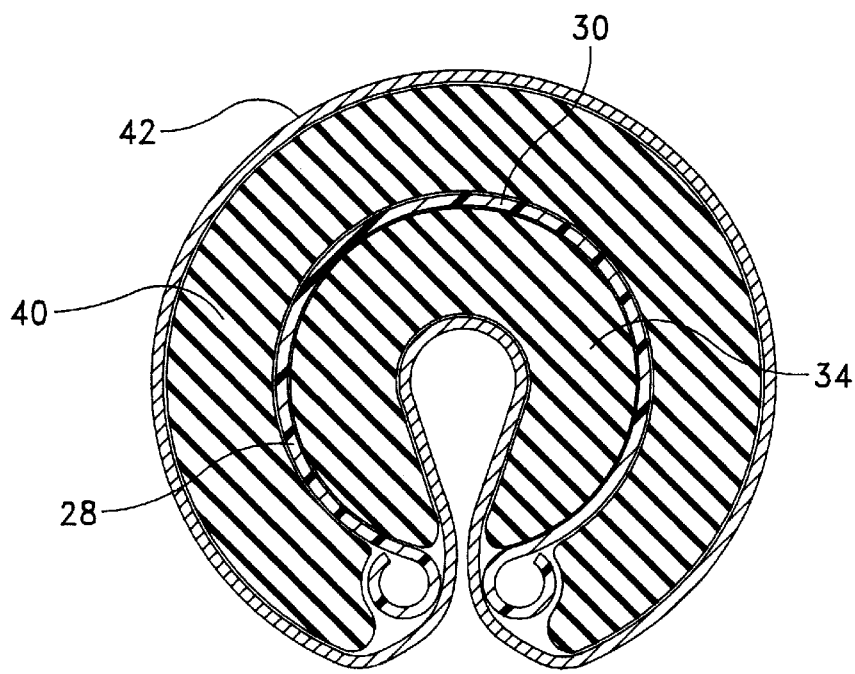
FIG. 3 is a cross-sectional view taken along line 3—3 of FIG. 2.
Figure 4:
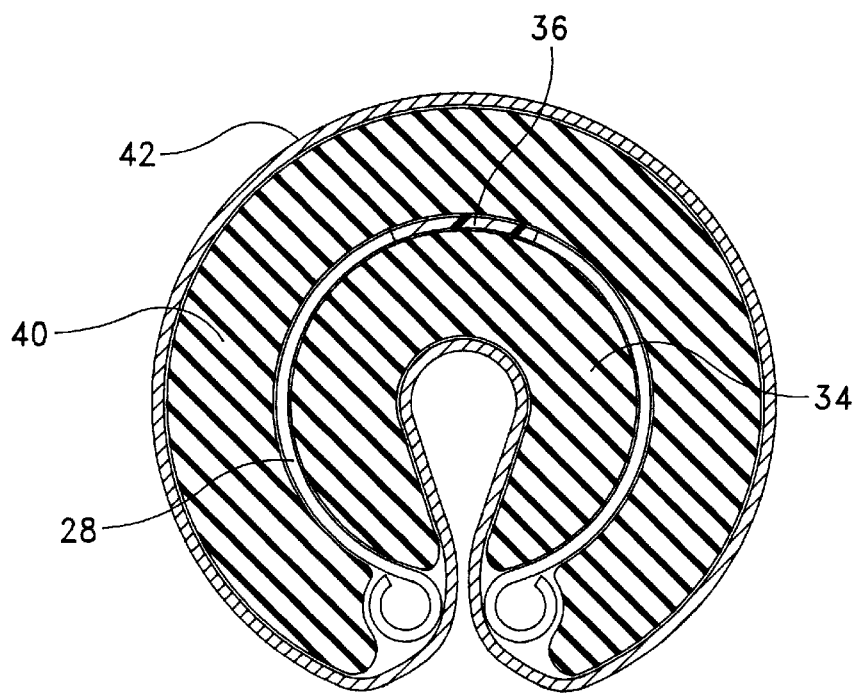
FIG. 4 is a cross-sectional view taken along line 4—4 of FIG. 2.
Figure 5:
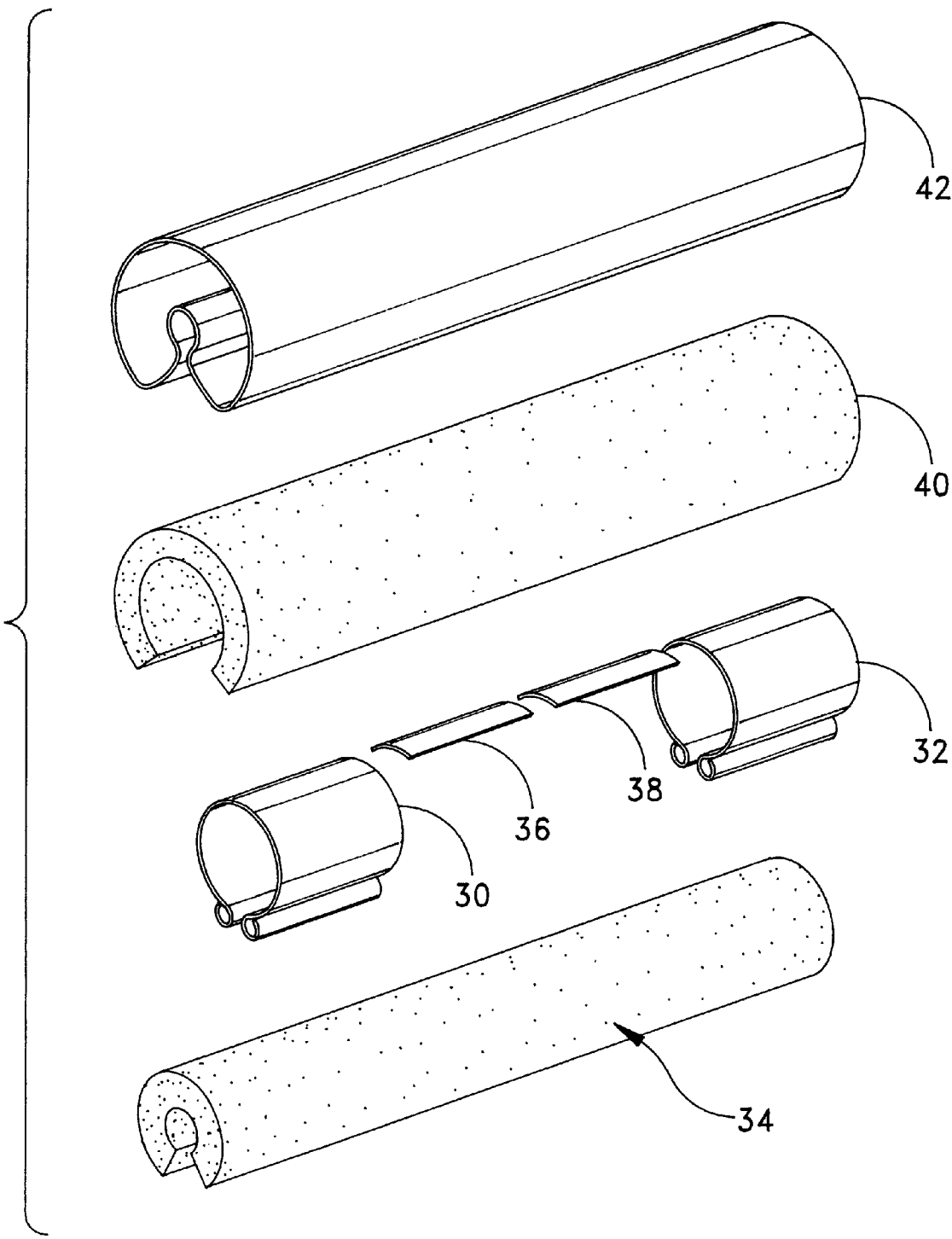
FIG. 5 is an exploded perspective view of the pet head rest of the instant invention.

Referring now to FIGS. 3–4, the clipping mechanism of the instant invention is shown and generally indicated at 28. As best shown in FIGS. 3–5, the clipping mechanism 28 is sandwiched within the elongate body construction of the pet head rest of the instant invention 10. Specifically, the clipping mechanism 28 includes a pair of clipping members 30 and 32 disposed over opposing ends of an inwardly positioned cushion 34 of the body construction. The clipping mechanism 28 preferably, although not necessarily, includes a pair of support plates 36 and 38 adjacently positioned lengthwise in a horizontal orientation between the clipping members 30 and 32 of the clipping mechanism 28. The support plates 36 and 38, which may be of any suitable material, such as plastic, provide an axis of support for the clipping members 30 and 32 so that they will remain at a fixed position within the elongate body construction of the pet head rest.

Referring now to FIG. 5, the construction of the elongate body 12 of the pet head rest 10 of the instant invention is more clearly depicted. A first inwardly positioned elongate U-shaped cushion is shown and generally indicated at 34. As previously described, the elongate body of the cushion terminates at opposing ends 14, 16, and has a pair of generally parallel side edges 18, 20 which extend the entire length of the body between the opposing ends. The parallel side edges define a slot opening 22 for receiving the top edge of the automobile window. A pair of oppositely disposed clip members 30 and 32 are positioned over the body of the inwardly positioned cushion 34 and generally conform to the shape thereof for biasing the slot opening 22 inwardly and maintaining the pet head rest 10 releasably secured to the top edge 24 of the automobile window 26. The clipping mechanism 28 biases the slot opening 22 to a closed position so that the side edges 18 and 20 are almost in a touching relation so that the pet head rest 10 takes on an almost tubular shape. Positioned between the oppositely disposed clipping members 30 and 32 are a pair of adjacently positioned support plates 36 and 38 which provide support means for the clipping members 36 and 38 of the clipping mechanism. Positioned over the clipping mechanism 28 is a second outwardly positioned elongate cushion 40 which generally conforms to the shape of the inwardly positioned cushion 34 but fabricated from a softer more resilient foam material. The arrangement is such that the clipping mechanism 28 is sandwiched between the outwardly 40 and inwardly 34 positioned elongate cushions. A durable sheathing material 42, i.e., leather or vinyl, is wrapped around the outwardly positioned cushion 40 to provide a protective covering for the outwardly exposed surface of the pet rest 10 when it is in an assembled condition. Any suitable adhesive binder is disposed between each layer of the body construction in order to maintain same in a fixed one piece body construction. Although not shown in the drawings, any number of desirable aesthetically pleasing covers may be releasably attached over the sheathing 42 of the body 12 to accommodate desired preferences. Preferably, a loop and fastener connector releasably maintains the cover over the sheathing 42 of the body 12 of the pet head rest 10.

Figure 6:
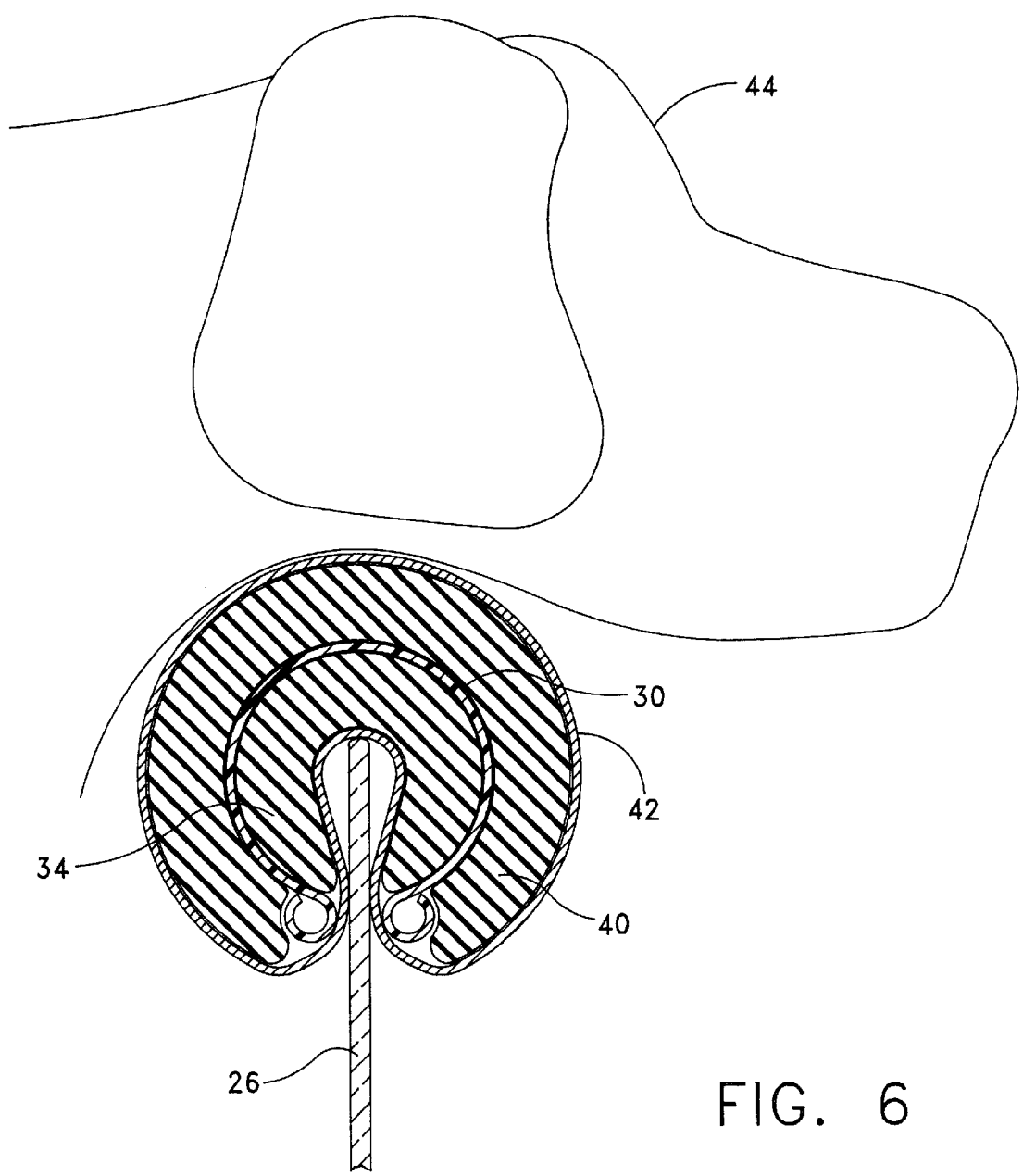
FIG. 6 is a sectional view similar to that shown in FIG. 4 showing a dog head resting thereon.

Referring now to FIG. 6, the pet head rest 10 is shown mounted on the top edge 24 of the automobile window 26 with a dog's head 44 resting thereon so that the underside of the dog's chin comfortably rests on the cushioned support. Specifically, in use, the side window 26 of the automobile is rolled almost all the way down so that a few inches of the window 26 extend from the window slot of the side door. At this point, the slot opening 22 of the cushion body is press fitted over the top edge of the automobile window so that the window is received within the slot, and the side edges of the slot frictionally engage opposing side surfaces of the automobile passenger side window. The head rest may be easily detached from the top edge of the automobile window by grasping the elongate body and pulling it upwardly from the top edge of the window. The clipping mechanism of the instant head rest is such that it applies enough pressure to resiliently maintain same in an attached and operable position at the top edge of the window. However, the device may also be manually removed from the use position without applying excessive force.

It can therefore be seen that the pet head rest of the instant invention is effectively operable for providing a cushioned support for a dog to rest his head on when riding in an automobile and extending same outside of the automobile window. A unique aspect of the instant head rest is that it is attachable to the top edge of the automobile window and is horizontally oriented thereacross so that the underside of the dog's chin comfortably rests thereon when the device is in use. The head rest makes riding in an automobile a more enjoyable experience for puppies and dogs alike and enables the driver to drive more safely because the pet will be more comfortably situated in the passenger side seat. The pet head rest is easily attached to the automobile window for use and easily detached from the automobile window when not in use. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A pet head rest attachable to the top edge of an automobile window providing a cushioned support for a dog to rest its head when extending same outside of the automobile window, said pet head rest comprising:

an elongate U-shaped cushioned body having opposing ends and a pair of side edges extending between said opposing ends and extending the entire length of said cushioned body to define a slot opening for receiving the top edge of said automobile window, said side edges each having a longitudinal axis, the longitudinal axis of said side edges being generally parallel to each other and;

means for biasing said side edges of said cushioned body inwardly for releasably mounting the head rest to the top edge of said automobile window, said means comprising a pair of oppositely disposed clipping members.

2. A pet head rest as set forth in claim 1, wherein said elongate U-shaped cushion is fabricated from a resilient foam material.

3. In combination a pet head rest attachable to the top edge of an automobile side window providing a cushioned support for a dog to rest its head when extending same outside of the automobile window, said combination comprising:

an elongate U-shaped cushioned body having opposing ends and a pair of side edges extending between said opposing ends and extending the entire length of said cushioned body to define a slot opening;

an automobile window having a generally planar exterior surface and interior surface, and having opposing top and bottom edges, wherein said slot opening of said cushion body is constructed and arranged to receive the top edge of said automobile window;

means for biasing said side edges of said cushioned body inwardly for releasably mounting the head rest to the top edge of said automobile window said means comprising a pair of oppositely disposed clipping members.

4. A pet head rest attachable to the top edge of an automobile side window providing a cushioned support for a dog to rest its head on when extending same outside of the automobile window, said pet head rest comprising:

a first inwardly positioned elongate U-shaped cushioned body having opposing ends and a pair of side edges extending between said opposing ends and extending the entire length of said cushioned body to define a slot opening for receiving the top edge of said automobile window, said side edges each having a longitudinal axis, the longitudinal axis of said side edges being generally parallel to each other;

clamping means positioned over the exterior body ends of said first elongate U-shaped cushion for biasing said side edges of the first elongate cushion inwardly;

a second outwardly positioned elongate U-shaped cushion conforming generally to the shape of said first inwardly positioned U-shaped cushion and positioned thereover so as to sandwich said clamping means therebetween;

a sheathing material wrapped around said second outwardly positioned elongate U-shaped cushion; and adhesive means disposed between said first and said second elongate cushions for fixedly maintaining same in an assembled relation.

5. A pet head rest as set forth in claim 4, further comprising a cover releasably received over said sheathing.

6. A pet head rest as set forth in claim 5, wherein said clamping means are a pair of resilient spring clips.

7. A pet head rest as set forth in claim 4, further comprising support means positioned between said clamping means to maintain the latter in properly spaced relation.

8. A pet head rest as set forth in claim 4, wherein said outwardly positioned elongate U-shaped cushion is fabricated from a softer foam material than said first inwardly positioned elongate cushion.

\* \* \* \* \*